United States Patent
Bingham et al.

(10) Patent No.: US 7,665,328 B2
(45) Date of Patent: Feb. 23, 2010

(54) METHOD OF PRODUCING HYDROGEN, AND RENDERING A CONTAMINATED BIOMASS INERT

(75) Inventors: Dennis N. Bingham, Idaho Falls, ID (US); Kerry M. Klingler, Idaho Falls, ID (US); Bruce M. Wilding, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 395 days.

(21) Appl. No.: 11/425,088

(22) Filed: Jun. 19, 2006

(65) Prior Publication Data

US 2006/0228295 A1 Oct. 12, 2006

Related U.S. Application Data

(63) Continuation-in-part of application No. 10/778,788, filed on Feb. 13, 2004, now Pat. No. 7,153,489.

(51) Int. Cl.
| | |
|---|---|
| F25J 1/02 | (2006.01) |
| C07C 27/06 | (2006.01) |
| C01B 3/02 | (2006.01) |
| C01B 31/18 | (2006.01) |
| C01B 6/00 | (2006.01) |
| C01B 6/04 | (2006.01) |

(52) U.S. Cl. ............ 62/607; 252/373; 423/418.2; 423/437.2; 423/645; 423/646; 423/647; 423/648.1; 423/655; 423/659; 518/702

(58) Field of Classification Search ......... 423/648.1, 423/418.2, 645, 646, 647, 659, 437.2, 655; 62/607; 518/702; 252/373
See application file for complete search history.

(56) References Cited

U.S. PATENT DOCUMENTS

| | | | |
|---|---|---|---|
| 3,504,494 | A | 4/1970 | Winsche |
| 3,943,719 | A | 3/1976 | Terry et al. |
| 4,593,534 | A | 6/1986 | Bloomfield |
| 4,671,080 | A | 6/1987 | Gross |
| 5,043,307 | A | 8/1991 | Bowes et al. |
| 5,161,382 | A | 11/1992 | Missimer |
| 5,348,924 | A | 9/1994 | Potter et al. |
| 5,363,655 | A | 11/1994 | Kikkawa et al. |
| 5,615,561 | A | 4/1997 | Houshmand et al. |
| 5,728,864 | A | 3/1998 | Motoyama et al. |
| 5,786,294 | A | 7/1998 | Sachtler et al. |
| 5,997,821 | A | 12/1999 | Joshi |
| 6,221,310 | B1 | 4/2001 | Checketts et al. |

(Continued)

OTHER PUBLICATIONS

Jacobson, Encyclopedia of Chemical Reactions, vol. VI (1956), Reinhold Publishing Corporation, p. 253 (no month).*
Agny et al. Synthesis of Methanol from Carbon Monoxide and Hydrogen Over a Copper-ZincOxide-Alumina Catalyst. Ind. Eng. Chem.Prod.Res.Dev. 1985, 24:50-55.

(Continued)

*Primary Examiner*—Wayne Langel
(74) *Attorney, Agent, or Firm*—TraskBritt

(57) ABSTRACT

A method for rendering a contaminated biomass inert includes providing a first composition, providing a second composition, reacting the first and second compositions together to form an alkaline hydroxide, providing a contaminated biomass feedstock and reacting the alkaline hydroxide with the contaminated biomass feedstock to render the contaminated biomass feedstock inert and further producing hydrogen gas, and a byproduct that includes the first composition.

32 Claims, 2 Drawing Sheets

U.S. PATENT DOCUMENTS

| | | | |
|---|---|---|---|
| 6,235,235 | B1 | 5/2001 | Checketts |
| 6,412,302 | B1 | 7/2002 | Foglietta |
| 6,471,935 | B2 | 10/2002 | Jensen et al. |
| 6,572,836 | B1 | 6/2003 | Schulz et al. |
| 6,581,409 | B2 | 6/2003 | Wilding et al. |
| 6,982,287 | B2 | 1/2006 | Wang et al. |
| 6,994,839 | B2 | 2/2006 | Reichman et al. |
| 7,078,012 | B2 | 7/2006 | Bingham et al. |
| 7,153,489 | B2 * | 12/2006 | Bingham et al. ......... 423/648.1 |
| 2003/0012717 | A1 | 1/2003 | Agnew et al. |
| 2004/0156777 | A1 * | 8/2004 | Reichman et al. ........ 423/648.1 |
| 2005/0106097 | A1 | 5/2005 | Graham et al. |
| 2005/0163704 | A1 * | 7/2005 | Reichman et al. ........ 423/648.1 |
| 2005/0163705 | A1 | 7/2005 | Reichman et al. |
| 2005/0271579 | A1 * | 12/2005 | Rogers .................... 423/648.1 |
| 2007/0009425 | A1 * | 1/2007 | Johnssen .................... 423/646 |
| 2007/0243128 | A1 * | 10/2007 | Reichman et al. ........ 423/648.1 |

OTHER PUBLICATIONS

Tang et al. Mono-sized Single-Walled Carbon Nanotubes Formed in Channels of ALPO4-5 Single Crystal. Applied Physics Letters, Oct. 19, 1998, 73: 2287-2289.

Govind et al. Zeolite-Catalyzed Hydrocarbon Formation From Methanol: Density Functional SimulationsInt. Int. J. Mol. Sci. 2002, 3: 423-434.

Kresge et al. Ordered Mesoporous Molecular Sieves Synthesized by a Liquid-Crystal Template Mechanism. Nature, 1992, 359: 710-712.

PCT International Search Report and Written Opinion of the International Searching Authority, mailed Jul. 21, 2008, 6 pages.

* cited by examiner

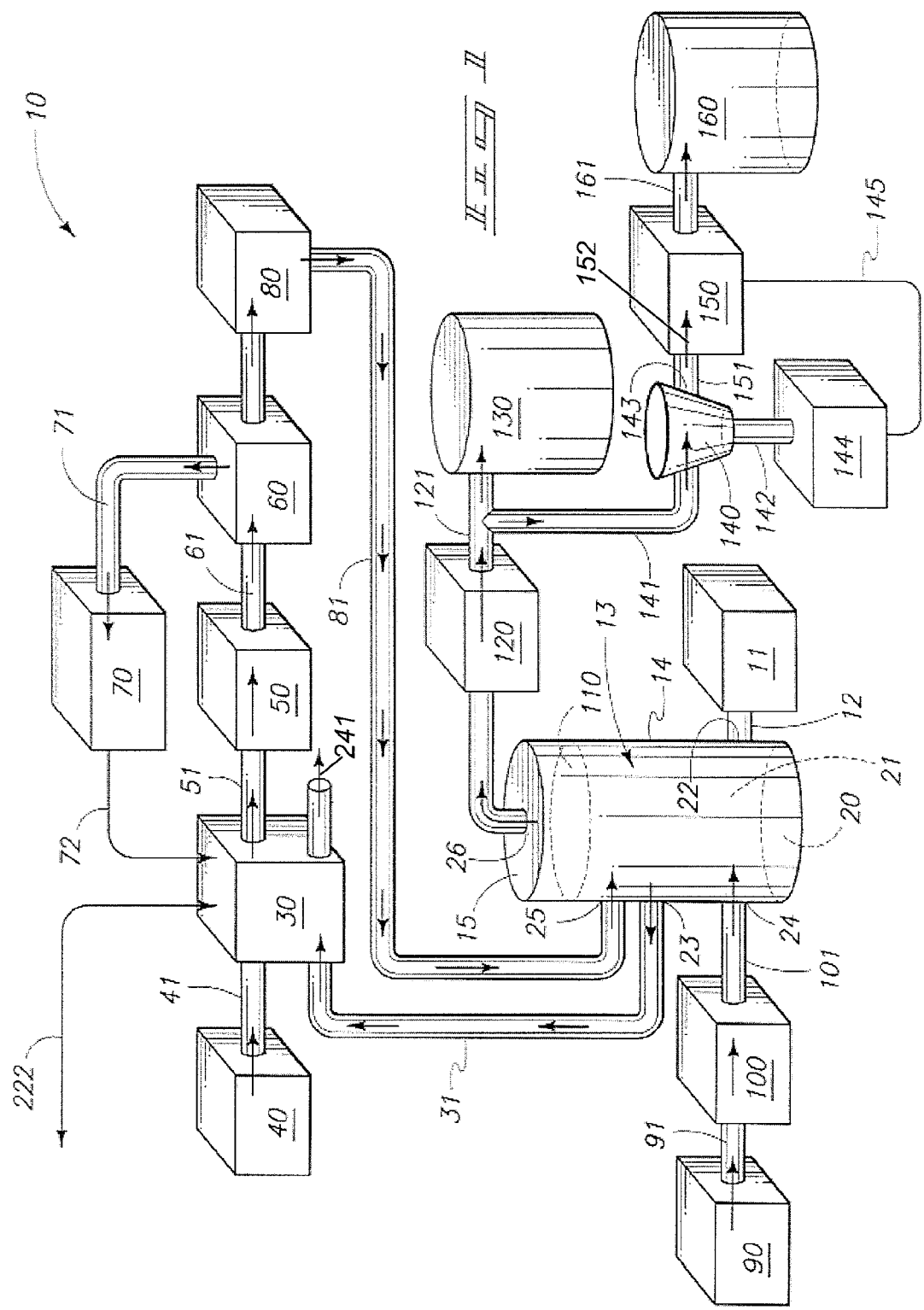

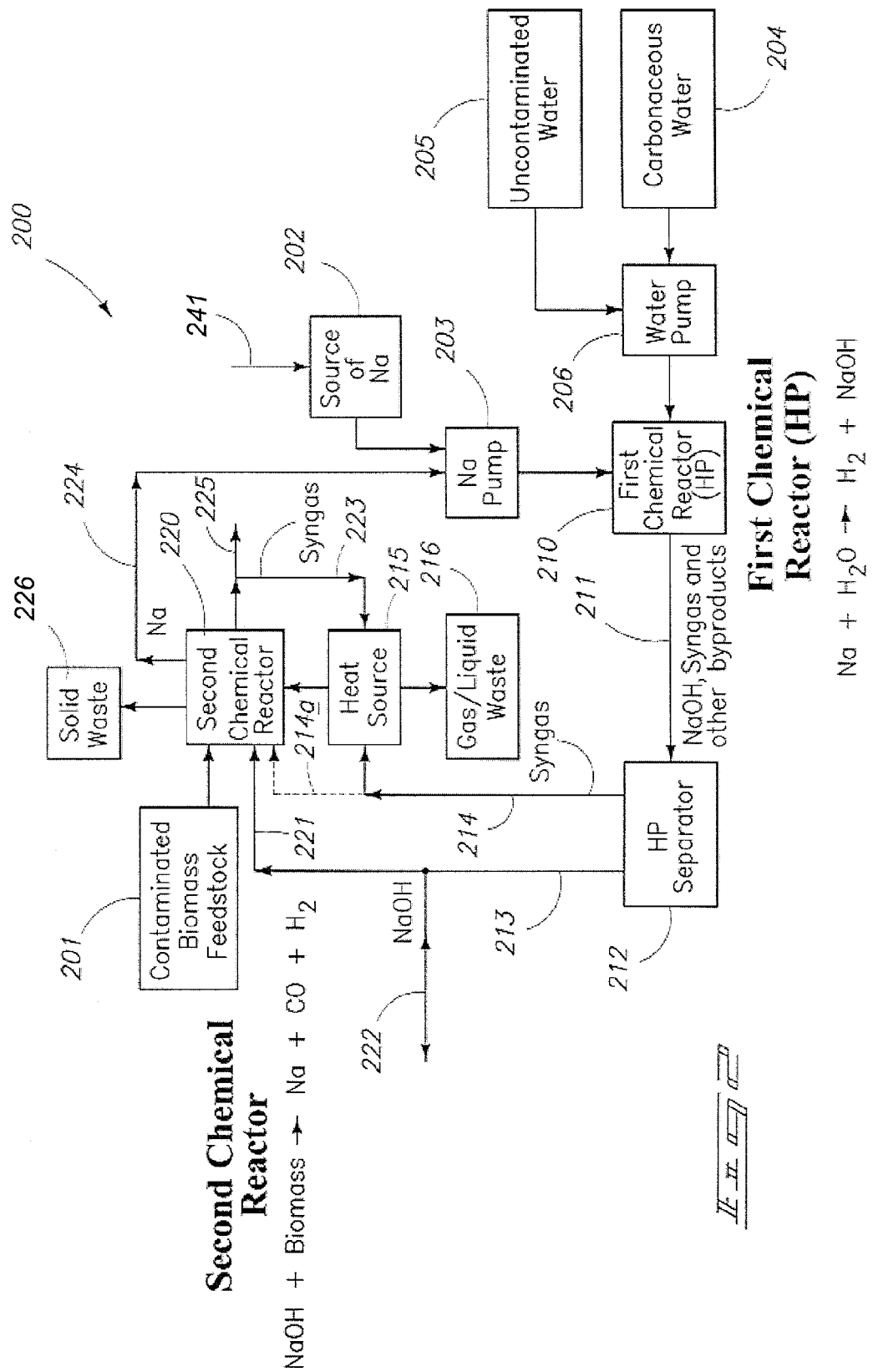

METHOD OF PRODUCING HYDROGEN, AND RENDERING A CONTAMINATED BIOMASS INERT

CROSS-REFERENCE TO RELATED APPLICATION

This application is a continuation-in-part of and claims priority to U.S. application Ser. No. 10/778,788, filed Feb. 13, 2004, now U.S. Pat. No. 7,153,489, issued Dec. 26, 2006.

GOVERNMENT RIGHTS

This invention was made with government support under Contract No. DE-AC07-05ID14517 awarded by the United States Department of Energy. The government has certain rights in the invention.

TECHNICAL FIELD

The present invention relates to a method of producing hydrogen and rendering a contaminated biomass inert, and more specifically to a method that, in a first aspect, produces a chemical hydride, which, when reacted with a liquid, produces hydrogen gas, and a byproduct, that is then later reused, or recycled to form an additional chemical hydride that is used in later reactions; and to a second aspect of the same method that utilizes an alkaline hydroxide to render a contaminated biomass inert.

BACKGROUND OF THE INVENTION

The prior art is replete with numerous examples of methods, devices, and various means, for storing and generating hydrogen and later using that same hydrogen for assorted industrial applications such as a fuel in various electrochemical devices like fuel cells, or which further can be consumed in internal combustion engines of various overland vehicles.

As a general matter, current methods of producing hydrogen have been viewed by most researchers as being expensive and very energy intensive. It has long been known that hydrogen can be produced from a chemical reaction of an alkali metal with water and various arrangements, such as what is shown in U.S. Pat. No. 5,728,864, have been devised to enclose a reactive material, such as an alkali metal, or metal hydride, that which, upon exposure to water, produces hydrogen as a product of that reaction.

While the advantages of using a fuel such as hydrogen to replace fossil fuel as a primary energy source are many, no single approach has emerged that will provide a convenient means whereby hydrogen can be economically produced in a form, whether gaseous, or liquefied, which makes it useful in the applications noted above. Still further, the methods currently disclosed in the prior art of producing useful chemical hydrides for the methodology discussed above, and which could potentially be used to implement, at least in part, a hydrogen infrastructure have remained elusive. Moreover, there remains no one convenient method that could be used to render a large amount of contaminated biomass inert.

Therefore, a method that addresses these and other perceived shortcomings in the prior art teachings and practice and that is also useful for rendering a biomass inert is the subject matter of the present application.

SUMMARY OF THE INVENTION

One aspect of the present invention is to provide a method for rendering a contaminated biomass inert that includes providing a first composition; providing a second composition; reacting the first composition and the second compositions together to form an alkaline hydroxide; providing a contaminated biomass and reacting the alkaline hydroxide with the contaminated biomass to render the contaminated biomass inert and further produce hydrogen gas, and a byproduct that includes the first composition.

Another aspect of the present invention is to provide a method for rendering a contaminated biomass inert that includes providing a source of a contaminated biomass; providing a source of an alkaline hydroxide, and chemically reacting the contaminated biomass with the alkaline hydroxide to render the contaminated biomass inert and to further produce an alkaline metal and a first gas; and combusting the first gas to generate heat energy that facilitates, at least in part, the chemical reaction of the alkaline hydroxide with the biomass to be destroyed.

Still another aspect of the present invention relates to a method for rendering a contaminated biomass inert that includes providing a first chemical reactor; supplying a source of an alkaline metal to the first chemical reactor; providing a source of water and reacting the alkaline metal and the source of water within the first chemical reactor to produce an alkaline hydroxide; providing a second chemical reactor and a third chemical reactor and supplying a portion of the alkaline hydroxide to the second chemical reactor and the third chemical reactor; providing a source of a contaminated biomass that is to be rendered inert, and chemically reacting the alkaline hydroxide with the source of the contaminated biomass within the second chemical reactor to produce an inert biomass, the alkaline metal, and a gaseous output, wherein the alkaline metal is returned to the first chemical reactor and reacted again with the source of water to generate an additional alkaline hydroxide; combusting the gaseous output to generate heat energy that is delivered, at least in part, to the second chemical reactor and the third chemical reactor; providing a source of a hydrocarbon to the third chemical reactor and reacting the alkaline hydroxide and the hydrocarbon within the third chemical reactor under conditions which are effective to produce a chemical hydride; providing a container and supplying the source of water under pressure to the container; supplying the chemical hydride to the container and reacting the chemical hydride with the source of water under pressure to produce a high pressure hydrogen gas, and the alkaline hydroxide; reusing the alkaline hydroxide, at least in part, in the second chemical reactor to react with the contaminated biomass to render the contaminated biomass inert, and reusing the alkaline hydroxide, at least in part, in the third chemical reactor to react with the hydrocarbon to generate an additional chemical hydride which is again reacted with the source of water in the container to produce additional high pressure hydrogen gas; and storing the high pressure hydrogen gas for use.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a greatly simplified schematic drawing illustrating an arrangement for producing hydrogen of the present invention.

FIG. 2 is a greatly simplified schematic drawing illustrating an arrangement for rendering a contaminated biomass inert of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An arrangement that is useful in practicing one aspect of the present invention is designated by the numeral 10 and is seen in FIG. 1. As illustrated therein, the methodology is useful in producing hydrogen, and includes as a first step providing a first composition 11, hereinafter referred to as a supply of sodium hydroxide 11. The supply of sodium hydroxide 11 is coupled in fluid flowing relation relative to a passageway or conduit, which is generally indicated by the numeral 12. This conduit or passageway 12 couples the first composition or the supply of sodium hydroxide 11 in fluid flowing relation relative to a container, which is indicated by the numeral 13. The supply of sodium hydroxide 11 may be produced, at least in part, by the methodology that is seen in FIG. 2, and will be described in further detail hereinafter. The container 13 is defined by a sidewall 14, and further includes a top surface 15, and a bottom surface 20. Both of the top surface 15 and bottom surface 20 are attached to the sidewall 14 and further define an internal cavity 21. First, second, third and fourth passageways or apertures 22, 23, 24 and 25 are formed through the sidewall 14 and couple the internal cavity 21 in fluid flowing relation relative to other assemblies, which will be discussed hereinafter. Still further, an aperture or passageway 26 is formed in the top surface 15. The passageway or conduit 12 is received in or through the first aperture 22.

The supply of sodium hydroxide 11, as may be provided, at least in part, by the methodology as seen in FIG. 2, and that constitutes a first composition 11, is received in the internal cavity 21 that is further defined by the container 13. As will be discussed in greater detail hereinafter, the first composition 11 is chemically reacted with a second composition, as will be described below, to produce a chemical hydride that, when subsequently reacted with a liquid, produces hydrogen gas and byproducts, which include the first composition or supply of sodium hydroxide 11. Still further, the supply of sodium hydroxide 11 may be reacted with a contaminated biomass feedstock, as will be described hereinafter, to render it inert and to produce other byproducts. This aspect of the invention will be discussed in greater detail in the paragraphs that follow. Thus, by means of the present methodology, the first composition 11 can be later reused or recycled to form an additional chemical hydride that is used in later chemical reactions, or in the alternative can be reacted with a contaminated biomass as will become more apparent from the discussion that is found in the paragraphs below. The supply of sodium hydroxide 11 that is received within the internal cavity 21 of the container 13, is further produced as a byproduct of the chemical reaction discussed above, passes from the internal cavity 21 of the container 13 through the second aperture 23, and is received within a chemical reactor, generally indicated by the numeral 30. The sodium hydroxide 11 travels to the chemical reactor 30 by way of a conduit or passageway 31. As will be discussed below, the supply of sodium hydroxide 11 provides a source of sodium to the reaction that is disclosed. It should be recognized that sodium may be added to the system or method as presently described at a number of different locations in order to meet the needs of the chemical reactions. These locations include directly at the chemical reactor 30, or further downstream in the process, which will be discussed below, or further by means of the method, which is best understood by a study of FIG. 2.

Method 10 of the present invention further includes the step of providing a source of a second composition 40 that provides a source of hydrogen and is reacted with the first composition 11 to produce a chemical hydride as will be described below. The second composition 40 may include various hydrocarbons such as methane, which may suitably react with the first composition 11 in order to release hydrogen that is utilized to form a resulting chemical hydride. The reaction which takes place within chemical reactor 30 is as follows: $CH_4 + NaOH \rightarrow CO + Na + 2.5H_2$. This chemical reaction and the method for implementing same is well known in the art and is discussed in significant detail in references such as U.S. Pat. Nos. 6,235,235 and 6,221,310, the teachings of which are incorporated by reference herein. The second composition or source of methane 40 is coupled in fluid flowing relation with the chemical reactor 30, by way of a conduit or passageway 41. Therefore, the method 10 of the present invention provides a step whereby the first composition 11, which may include sodium hydroxide, and the second composition 40, which may include methane, are supplied to the chemical reactor 30 and chemically react together to produce a chemical hydride, such as sodium hydride and other byproducts. The byproducts produced by this chemical reaction of the first and second compositions 11 and 40 may include undesirable compositions such as carbon monoxide, and the like. Consequently, method 10 of the present invention further includes the step of providing a shift converter 50, and supplying the byproducts that may include carbon monoxide to the shift converter 50 and chemically converting the carbon monoxide to carbon dioxide within the shift converter 50. The shift converter 50 is coupled to the chemical reactor 30 by way of a conduit or passageway 51. By employing the methodology as discussed in the previous prior art patents, some liquid sodium 241 may be drawn from the chemical reactor 30 and thereafter supplied to other steps in the present invention. The remaining sodium and hydrogen combine together to produce sodium hydride.

Method 10 of the present invention further includes a step of providing a separator 60 which is coupled in fluid flowing relation relative to the shift converter 50 by way of a conduit or passageway 61. The separator 60 is operable to receive the resulting chemical hydride such as sodium hydride, and other byproducts produced by the reaction of the first composition 11 with the second composition 40 and provide a portion of the byproducts, which may include any remaining carbon monoxide and carbon dioxide produced as a result of the conversion of carbon monoxide to carbon dioxide that occurred in the shift converter 50 to a burner 70. The burner 70 is coupled to the separator 60 by way of a conduit or passageway 71. The byproducts, which may include carbon monoxide, carbon dioxide and some hydrogen are received in the burner 70 where they are consumed by combustion and produce resultant heat energy. This same burner 70 may also receive Syngas produced by means of the methodology as seen in FIG. 2, and combust same to produce additional heat. Moreover, this same heat produced by the burner 70, may be diverted, at least in part, and be delivered to a reactor, which will be described hereinafter, that receives contaminated biomass feedstock that is to be rendered inert. This heat energy produced by the burner 70 forms a heat energy, generally indicated by the numeral 72. The heat energy 72 is subsequently provided to the chemical reactor 30 to increase the temperature of the first and second compositions 11 and 40, respectively, which are chemically reacting within chemical reactor 30 in order to produce a source of chemical hydride 80, which may include sodium hydride, and various byproducts, or delivered to the aforementioned reactor which will be discussed in greater detail below.

The source of the chemical hydride 80, which may include sodium hydride, is coupled in fluid flowing relation relative to the internal cavity 21 of the container 13 by way of a conduit or passageway 81. The source of the chemical hydride 80 passes into the internal cavity 21 by way of the fourth aperture or passageway 25. Method 10 of the present invention further includes the step of providing a source of a liquid 90, such as water, and reacting the source of the chemical hydride 80 with the liquid 90 in a manner that produces a high pressure hydrogen gas and a byproduct that includes the first composition 11. While the discussion above indicates that the source of chemical hydride is provided first, and then reacted with the liquid 90, it should be understood that this order of introduction is not important, and these compositions could be supplied in reverse order, or together, to achieve the benefits of the present method 10. In this regard, the source of the liquid 90, such as water, is supplied by way of a conduit or passageway 91 to a charging pump, generally indicated by the numeral 100. The charging pump 100 is further coupled by way of a conduit or passageway 101, to the container 13 where the liquid 90, such as water, passes into the internal cavity 21 by way of the third aperture or passageway 24 formed in the sidewall 14. The charging pump 100 is operable to supply the liquid 90, such as water, to the internal cavity 21 and then maintain the liquid 90 received within the internal cavity 21 at a pressure of at least 150 psi.

In the method 10 of the present invention, following the step of supplying the source of the chemical hydride 80, such as sodium hydride to the internal cavity 21 of the container 13, and mixing the source of liquid 90, such as water, with same, a chemical reaction results that produces high pressure hydrogen gas 110 and other byproducts including the first composition 11. As earlier discussed, the sodium hydroxide 11, which is generated as a result of this chemical reaction, may then be recycled or reused by exiting or passing from the container 13 and being returned by way of the conduit or passageway 31 to the chemical reactor 30 where it may be subsequently reacted with the second composition 40, which may include additional methane, to produce a further chemical hydride, such as sodium hydride 80. As a result of the liquid pressure provided within the container 13, as maintained by the charging pump 100, a high pressure hydrogen gas 110 is produced.

Method 10 of the present invention further includes the step of providing the source of high pressure hydrogen gas 110 produced in the container 13 to a hydrogen dryer, generally indicated by the numeral 120. This dryer could be any type of commercial dryer. The hydrogen dryer 120 is utilized to remove any water, or other liquids that may be mixed with the high pressure hydrogen gas 110, thereby making it more useful for particular applications. In the application as shown, the hydrogen dryer 120 could be a configuration of sodium that would react with any remaining water 90 to remove same from the high pressure hydrogen gas 110. If this option is utilized, a hydrogen dryer 120 would not be required. As should be understood, this hydrogen dryer 120 may not be necessary for certain applications because there are benefits to be derived from having, for example, gaseous water mixed with the resulting high pressure hydrogen gas 110. This mixture would be useful, for example, as a fuel, which may be utilized in proton exchange membrane fuel cells, and the like.

Method 10 of the present invention further includes the step of withdrawing the high pressure hydrogen gas 110 from the internal cavity 21 of the container 13, which has passed through the hydrogen dryer 120 and receiving it in a storage container 130, where it may be subsequently drawn off, at a high pressure and supplied as a fuel for various end uses. The high pressure hydrogen gas 110 exits the hydrogen dryer 120 and is received in the storage container 130 by way of a conduit or passageway 121.

Method 10 of the present invention further includes a step of providing an expansion engine 140 and coupling the expansion engine in fluid flowing relation relative to the cavity 21 of the container 13 by way of a conduit or passageway 141. The conduit or passageway 141 is coupled in fluid flowing relation relative to the conduit or passageway 121 as seen in FIG. 1. As earlier discussed, the previous step of pressurizing the liquid 90, such as water, within the container 13 and mixing the source of sodium hydride 80 with same, produces a high pressure hydrogen gas 110. As seen in FIG. 1, the high pressure hydrogen gas 110, following treatment by the hydrogen dryer 120, is delivered to the expansion engine 140. Expansion engines are well known in the art and include internal turbines (not shown) that, when exposed to the flow of the high pressure hydrogen gas 110, produce a mechanical output 142, and a gas output 143 having a reduced pressure and a reduced temperature. The mechanical output 142 of the expansion engine 140 is converted into various power or work outputs, which may include, but are not limited to, mechanical, electrical, hydraulic, etc., that are subsequently transmitted by way of an expansion engine 144, or other force or work transmission means, to a refrigeration assembly, generally indicated by the numeral 150. The refrigeration assembly 150 is of conventional design and is coupled in fluid flowing relation relative to the gas output 143 of the expansion engine 140 by way of a fluid conduit or passageway 151. The expansion engine 140 is operable to generate, at least in part, the power or work output necessary to energize or actuate the refrigeration assembly 150. The gas output 143 of the expansion engine 140, once received by the refrigeration assembly 150 is further reduced in temperature thereby liquifying the hydrogen gas 110. The hydrogen gas 110, which has been cooled to a liquid, now moves from the refrigeration assembly 150 to a storage container 160 by way of a conduit or passageway 161.

In the method 10, as described above, the step of pressurizing the liquid 90 includes pressurizing the liquid 90 to a pressure that causes the resulting high pressure hydrogen gas 110 to have a pressure of at least 150 psi. Still further, the step of supplying the high pressure hydrogen gas 110 to the expansion engine 140 comprises providing a gas output 143 having a reduced temperature of less than about 50° C., and a pressure greater than about 1 atmosphere or ambient. In the embodiment as shown in FIG. 1, the expansion engine 140 may comprise a turbo-expander (not shown) that is coupled in fluid receiving relation relative to the high pressure hydrogen gas 110. In this arrangement, the turbo-expander generates an electrical power output 145 that is transmitted by way of a transmission pathway and provides a preponderance of the electrical power, or work energy needed by the refrigeration assembly 150 to liquefy the high pressure hydrogen gas 110. The expansion engine 140, in combination with the refrigeration assembly 150 is operable to reduce the temperature of the high pressure hydrogen gas 110 to at least about −200° F. and further reduce the pressure of the high pressure hydrogen gas 110 to less than about 150 psi.

A second aspect of the present invention relates to a method for rendering a contaminated biomass inert, generally indicated by the numeral 200 in FIG. 2. As should be understood, the methodology as shown in FIG. 2, can in one form operate as a separate stand-alone method. Or alternatively, method 200 is operable to be coupled and cooperate in various ways with method 10 of the present invention, as seen in FIG. 1. As should be understood, method 200 as shown in FIG. 2 is useful for rendering a source of a contaminated biomass feedstock 201 inert. The contaminated biomass feedstock 201 may be contaminated with various chemicals including hydrocarbons, and the like, and that render it not useful for human or other animal consumption or exposure. The contaminates that may render the biomass contaminated or dangerous for consumption or exposure may be selected from the group comprising hydrocarbon compounds containing fluorine, chlorine, bromine, iodine, metals, and metal oxides thereof. As shown in FIG. 2, method 200 includes a first step of providing a first composition 202 that typically comprises a source of sodium. The source of sodium or first composition 202 may be supplied solely, or in part, from the liquid sodium 241 that is drawn off from the chemical reactor 30, as described by reference to method 10 of FIG. 1, or may, in the alternative, be supplied from a separate source. The source of sodium or first composition 202 is supplied to a sodium pump 203 of conventional design so that it may be moved or transferred to a first chemical reactor, which will be discussed below. Still further, the method 200 includes a second step of providing a second composition 204, which may comprise, in one form, a contaminated/carbonaceous water source as indicated in FIG. 2, or alternatively, a source of uncontaminated water 205. The second composition 204, 205 is delivered to a water pump 206 of conventional design. The water pump 206 supplies the second composition 204 comprising either one or both of the contaminated or uncontaminated water to a first chemical reactor 210 that is operated under high pressure (HP) conditions in order to react the first and second compositions, that is, sodium and water together to form a source of alkaline hydroxide (such as sodium hydroxide) and other byproducts generally indicated by the numeral 211. As shown in FIG. 2, a typical reaction in the first chemical reactor 210 is illustrated, however, it should be appreciated, that if a contaminated water input is supplied, which includes a hydrocarbon, for example, other byproducts could potentially be produced by this reaction. The sodium hydroxide and other byproducts, which may include hydrogen gas and carbon monoxide, are received in a high pressure (HP) separator assembly 212. The high pressure separator assembly 212, which is well known in the art, is useful for separating the sodium hydroxide into a stream, now indicated by the numeral 213, from the remaining Syngas, now indicated by the numeral 214. In the present application, Syngas is defined as a mixture of carbon monoxide and hydrocarbons, which are derived from hydrocarbon fuels. This first Syngas stream 214 is subsequently combusted to provide a heat source 215 which is supplied to a second chemical reactor 220, as will be described in greater detail hereinafter. Alternatively, the Syngas stream 214a may be supplied directly to the second chemical reactor 220 in order to react with the contaminated biomass feedstock 201. The combustion of the first Syngas stream 214, which may include other byproducts, produces a gas or liquid waste stream 216 that is then disposed of in an environmentally acceptable fashion or further may be supplied or otherwise combined with the carbonaceous/contaminated water 204 and processed again.

As shown in FIG. 2, method 200 broadly includes the steps of providing a contaminated biomass feedstock 201 and reacting the alkaline hydroxide 213 with the contaminated biomass feedstock 201 to render the contaminated biomass feedstock 201 inert and further produce hydrogen gas and a byproduct that includes the source of sodium or first composition 202. In this regard, method 200 of the present invention includes another step of providing a second chemical reactor 220, delivering the alkaline hydroxide 213 and the contaminated biomass feedstock 201 to the second chemical reactor 220. As shown in FIG. 2, the source of the alkaline hydroxide 213 has a first course of travel 221 whereby the source of alkaline hydroxide 213 is delivered into the second chemical reactor 220 and a second course of travel 222 whereby a portion of the alkaline hydroxide 213 may be utilized in method 10 as shown in FIG. 1. Alternatively, alkaline hydroxide, such as sodium hydroxide 11, may be supplied from method 10 to method 200 as shown in FIG. 2. As can be readily discerned from a study of FIG. 2, the combustion of the first Syngas stream 214 produces a heat source 215 that is supplied to the second chemical reactor 220 in order to effect or otherwise facilitate a chemical reaction as identified in FIG. 2, that is, the sodium hydroxide 11 reacts with a contaminated biomass feedstock 201 under the influence of heat and pressure to produce a second Syngas stream 223, which contains hydrogen and sodium or other alkaline metal 224 that is then delivered back to the sodium pump 203 for use again in the first chemical reactor 210. The second Syngas stream 223, which may comprise carbon monoxide, hydrogen, and other byproducts, may be combusted, at least in part, to provide the heat source 215, which sustains or otherwise facilitates the chemical reaction within the second chemical reactor 220. Still further, this second Syngas stream may be diverted into another chemical process 225 where it is catalytically reformulated into a predetermined specific product stream that may include various hydrocarbons depending upon the source of contamination that effects the contaminated biomass feedstock 201. As should be understood, this same catalytic reformulation of the second Syngas stream 223 could further be employed, at least in part, with the first Syngas stream 214. It will be further understood, that the heat source 215 may be additionally supplemented with heat energy as provided from the burner 70, as shown in FIG. 1. Still further, it should be appreciated, that the first and second Syngas streams 214 and 223, respectively, may be supplied in whole, or in part, to the burner 70, as shown in FIG. 1, to support method 10.

A method for rendering a contaminated biomass inert, generally indicated by the numeral 200, broadly includes a first step of providing a first composition 202, 224, a second step of providing a second composition 204, 205 and reacting the first composition 202, 224 and the second composition 204, 205 together to form a source of alkaline hydroxide 213. The method 200 further includes another step of providing a contaminated biomass feedstock 201, reacting the alkaline hydroxide 213 with the contaminated biomass feedstock 201 to render the contaminated biomass feedstock 201 inert, and further producing hydrogen gas that is incorporated in the second Syngas stream 223 and a byproduct, which includes the first composition 224. Still further, method 200 of the present invention includes a step of reusing or recycling the first composition 224, formed as a byproduct in a subsequent chemical reaction in the first chemical reactor 210, to form additional alkaline hydroxide 213. In method 200, as described above, the method 200 includes another step of providing a first chemical reactor 210, wherein the step of reacting the first and second compositions 202, 224 and 204, 205, respectively, to form the alkaline hydroxide 213 comprises delivering the first and second compositions 202, 224 and 204, 205, to the first chemical reactor 210. In the methodology as described above, the method 200 includes another step of providing a second chemical reactor 220, wherein the step of reacting the alkaline hydroxide 213 with the contaminated biomass feedstock 201 further comprises delivering the alkaline hydroxide 213 and the contaminated biomass feedstock 201 to the second chemical reactor 220. In the methodology as described above, the first composition 202, 224 comprises an alkaline metal, such as sodium, and the second composition 204, 205 comprises water, which may, or may not, be contaminated with other materials. Method 200 as described above, and referring to FIGS. 1 and 2, further comprises the steps of providing a third chemical reactor 30 and supplying the alkaline hydroxide 11, 213 to the third chemical reactor 30. Method 200 further includes another step of providing a source of a hydrocarbon 40 and reacting the source of the hydrocarbon 40 with the alkaline hydroxide 11, 213 to produce a chemical hydride 80 and a byproduct.

As described above, and still referring to FIGS. 1 and 2, method 200 includes a further step of reacting a source of water 90, 205 with the chemical hydride 80 in a manner to produce a high pressure hydrogen gas 110, and the alkaline hydroxide 11, 213. Method 200 includes yet another step of providing a burner 70 and combusting, at least in part, the high pressure hydrogen gas 110 that forms a portion of the second Syngas stream 223, and which is produced by the reaction of the alkaline hydroxide 213 with the contaminated biomass feedstock 201 to produce heat energy 72, 215. This heat energy 72, 215 may be supplied in a subsequent step, at least in part, to the second chemical reactor 220 and the third chemical reactor 30, as shown in FIGS. 1 and 2, respectively.

As shown in FIG. 1, method 200 includes another step of providing a container 13, defining an internal cavity 21 and supplying the liquid 90 to the internal cavity 21 of the container 13. The method 10 of the present invention further includes another step of increasing the pressure of the liquid 90, such as water, within the container 13 to a high pressure by means of a charging pump 100, and supplying the chemical hydride 11, 213 to the internal cavity 21 of the container 13 to chemically react with the liquid 90, which is under high pressure, to produce the high pressure hydrogen gas 110 and the alkaline hydroxide 213. As shown in FIG. 1, method 10 further includes another step of utilizing the high pressure hydrogen gas 110, at least in part, to produce a work product. In this regard, method 10 includes a further step of providing an expansion engine 144, and coupling the expansion engine 144 in fluid flowing relation relative to the high pressure hydrogen gas 110, wherein the expansion engine 144 produces a hydrogen gas output 152 having a reduced temperature and a reduced pressure, which further generates an electrical power output 145. Method 10 includes another step of coupling the expansion engine 144 in fluid flowing relation relative to a refrigeration assembly 150, wherein the hydrogen gas output 152 having the reduced temperature, and the reduced pressure is provided to the refrigeration assembly 150. Method 10 further includes another step of energizing the refrigeration assembly 150, at least in part, by supplying the electrical power output 145 generated by the expansion engine 144 to further reduce the temperature of the hydrogen gas output 152 to liquefy the high pressure hydrogen gas 110.

Another aspect of the present invention relates to a method 200 for rendering a contaminated biomass inert that includes a first step of providing a source of a contaminated biomass feedstock 201 and a second step of providing a source of an alkaline hydroxide 213 and chemically reacting the contaminated biomass feedstock 201 with the alkaline hydroxide 213 to render the contaminated biomass feedstock 201 inert and to further produce an alkaline metal 224 and a first gas that is within second Syngas stream 223. Still further, the method includes another step of combusting the first gas that is within second Syngas stream 223 to produce a heat source or energy 215 that facilitates, at least in part, the chemical reaction of the alkaline hydroxide 213 and the contaminated biomass feedstock 201. Method 200, as described above, further includes another step of catalytically reformulating the first gas within second Syngas stream 223 into a predetermined product stream. In this regard, the first gas, which is included within the second Syngas stream 223, is selected from the group comprising carbon monoxide and hydrogen, wherein the step of catalytically reformulating the first gas comprises a creation of a specific product stream from the first gas.

In method 200, as described above, the step of providing a source of the alkaline hydroxide 213 further includes the steps of providing a first chemical reactor 210, providing a source of water 204, 205, supplying the source of water 204, 205 to the first chemical reactor 210 and further supplying the alkaline metal 202, 224 to the first chemical reactor 210 to form the source of the alkaline hydroxide 213. As shown by reference to FIG. 2, the source of water 205 may be uncontaminated. Still further, the source of water 204 may contain contaminants which are to be rendered inert along with the contaminated biomass feedstock 201. As noted earlier, the contaminants are selected from the group comprising hydrocarbon compounds containing fluorine, chlorine, bromine, iodine, metals, and metal oxides thereof. Of course, method 200 could be used with a wide range of contaminants. The preceding list of contaminants is merely exemplary. In the arrangement as shown in FIG. 2, the chemical reaction of the alkaline metal 202, 224 and the source of water 204, 205 to produce the source of the alkaline hydroxide 213 generate a second gas that may be included in the first Syngas stream 214, wherein the method 200 further comprises the step of combusting the first and second gases found within first and second Syngas streams 214 and 223, respectively, at least in part, to generate heat energy 215, which facilitates, at least in part, the chemical reaction of the contaminated biomass feedstock 201 that is to be rendered inert, with the alkaline hydroxide 213. As earlier noted, the heat energy 215 produced by the combustion of these gases may also be delivered, at least in part, to the third chemical reactor 30, as shown in FIG. 1. As earlier noted, the first and second gases which may be included in a first Syngas stream 214, and a second Syngas stream 223 may comprise, at least in part, hydrogen gas and carbon monoxide.

In the present arrangement, as shown in FIG. 2, alkaline hydroxide 213 and the contaminated biomass feedstock 201 are chemically reacted together in the second chemical reactor 220 at a temperature of greater than about 275° C. and a pressure of greater than about 5 pounds per square inch absolute. In method 200, as shown in FIG. 2, the step of chemically reacting the contaminated biomass feedstock 201 with the source of alkaline hydroxide 213 to produce the alkaline metal 224 and the first gas, which is included within second Syngas stream 223, further includes the steps of providing a second chemical reactor 220 and supplying the contaminated biomass feedstock 201 and the source of the alkaline hydroxide 213 to the second chemical reactor 220, and maintaining the second chemical reactor 220 at a temperature and a pressure that renders the contaminated biomass feedstock 201 substantially inert and that further produces the first gas in second Syngas stream 223 and the alkaline metal 224. As shown by reference to FIG. 2, the contaminated biomass feedstock 201 that has been rendered inert, forms solid waste 226 that is then disposed of in an environmentally acceptable fashion. In the arrangement as shown in FIG. 2, the heat source or heat energy 215 generated from the combustion of the first gas and second gas in second Syngas stream 223 and first Syngas stream 214, respectively, is supplied, at least in part, to the second chemical reactor 20. As shown in FIG. 2, it will also be recognized that the method 200 also includes another step of separating the second gas from first Syngas stream 214 from the source of alkaline hydroxide 213 prior to the chemical reaction of the alkaline hydroxide 213 with the contaminated biomass feedstock 201.

Referring now to FIG. 1, it will be seen that method 10 includes the step of providing a third chemical reactor 30, and supplying, at least in part, a portion of the alkaline hydroxide 213 to the third chemical reactor 30. Still further, the method 10 includes a step of selecting a second composition 40, which provides a source of hydrogen and supplies the source of hydrogen to the third chemical reactor 30. Still further, this method 10 includes another step of providing conditions within the third chemical reactor 30 to react the alkaline hydroxide and the second composition 40 to produce a chemical hydride 80. Still further, the method 10 includes another step of providing a container 13 and supplying a source of liquid 90, such as water, to the container 13 under pressure, and reacting the chemical hydride 80 with the water 90 under pressure within the container 13 to produce high pressure hydrogen gas 110 and byproducts, which include the alkaline hydroxide 11, 213. Method 10, as described above, further includes another step of supplying, at least in part, the alkaline hydroxide 11, 213 produced by the reaction of the chemical hydride 80 with the liquid 90 back to the third chemical reactor 30 for further reaction. In the arrangement as shown in FIG. 1, the second composition 40, which provides the source of hydrogen, comprises methane, and wherein one of the byproducts produced by the chemical reaction of the alkaline hydroxide 11, 213 and the methane 40 to produce the chemical hydride 80 comprises, at least in part, carbon monoxide, wherein the method 10 further comprises providing a shift converter 50 where the byproducts, including the carbon monoxide, are chemically converted into carbon dioxide. As should be understood by reference to the paragraphs above, the alkaline hydroxide 11, 213 as utilized herein can, in one form of the invention, comprise sodium hydroxide and the chemical hydride may comprise sodium hydride. Method 10 further includes the step of storing a portion of the high pressure hydrogen gas 110 for use in the storage container 130, 160 and combusting a portion of the high pressure hydrogen gas 110 to produce heat energy or heat energy 72 that is delivered, at least in part, to the first chemical reactor 210, second chemical reactor 220, and third chemical reactor 330. In the methodology as described above, after the step of chemically reacting the contaminated biomass feedstock 201 with the alkaline hydroxide 213 to render the contaminated biomass feedstock inert 201, method 200 further comprises a step of recovering or otherwise recycling the alkaline metal 224 in the first chemical reactor 210 to produce an additional alkaline hydroxide 213.

OPERATION

The operation of the described embodiments of the present invention are believed to be readily apparent and are briefly summarized at this point.

Referring now to FIGS. 1 and 2, it will be seen that a method 200 for rendering a contaminated biomass feedstock 201 inert includes a first step of providing a first chemical reactor 210 and supplying a source of an alkaline metal 202, 224 to the first chemical reactor 210. Still further, the method 200 includes another step of providing a source of water 204, 205 and reacting the alkaline metal 202, 224 with the water 204, 205 within the first chemical reactor 210 to produce a source of alkaline hydroxide 213. As shown in FIG. 2, the method 200 includes another step of providing a second chemical reactor 220 and a third chemical reactor 30 (FIG. 1), respectively, and supplying a portion of the alkaline hydroxide 213 to the second and third chemical reactors 220 and 30, respectively. Method 200 includes another step of providing a source of a contaminated biomass feedstock 201, which is to be rendered insert and chemically reacting the alkaline hydroxide 213 with the source of the contaminated biomass feedstock 201 within the second chemical reactor 220 to produce an inert biomass in the form of solid waste 226, the alkaline metal 224, and a second Syngas stream 223. In the arrangement shown in FIG. 2, the alkaline metal 224 is returned or otherwise recycled to the first chemical reactor 210 and chemically reacted again with the source of water 204, 205 to generate an additional alkaline hydroxide 213. In method 200, as shown in FIG. 2, the method 200 includes another step of combusting the second Syngas stream 223 to generate a heat source or heat energy 215 that is delivered, at least in part, to the second and third chemical reactors 220 and 30, respectively. Still further, method 10, as shown in FIG. 1, further includes another step of providing a source of a hydrocarbon 40 to the third chemical reactor 30, and reacting the alkaline hydroxide 11, 213 and the hydrocarbon 40 within the third chemical reactor 30 under conditions that are effective to produce a chemical hydride 80. In the methodology as shown in FIGS. 1 and 2, the method 10, 200 further includes another step of providing a container 13, and supplying the source of water, such as 90, 205, under pressure to the container 13, and further supplying the chemical hydride 80 to the container 13 and reacting the chemical hydride 80 with the water 90, 205, under pressure to produce a high pressure hydrogen gas 110 and the resulting alkaline hydroxide 213. In the methodology as seen in FIGS. 1 and 2, the method 10, 200, includes another step of regenerating additional alkaline hydroxide 11, 213, at least in part, in the second chemical reactor 220 to react with additional contaminated biomass feedstock 201 to render the contaminated biomass inert feedstock 201 and in the third chemical reactor 30 to react with additional hydrocarbon 40 to generate additional chemical hydride 80 that is again reacted with the water 90, 205, in the container 13 to produce additional high pressure hydrogen gas 110. The methodology as described in the present application further includes the step of storing the high pressure hydrogen gas 130, 160 for further use.

Therefore, it will be seen that the present invention provides many advantages over the prior art devices and methods that have been utilized heretofore, and further is effective to produce chemical hydrides that are useful in the production of hydrogen gas at remote locations, and additionally is useful in the rendering of contaminated biomass inert for the purposes described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for rendering a contaminated biomass inert, comprising:

reacting a first composition comprising an alkaline metal and a second composition to produce an alkaline hydroxide;

reacting the alkaline hydroxide with a contaminated biomass to render the contaminated biomass inert and produce hydrogen gas and a byproduct that includes the first composition.

2. The method of claim 1, further comprising:
reusing the first composition formed as a byproduct in a subsequent chemical reaction to form additional alkaline hydroxide.

3. The method of claim 1,
wherein reacting the first composition and the second composition to produce the alkaline hydroxide comprises delivering the first composition and the second composition to a first chemical reactor.

4. The method of claim 1,
wherein reacting the alkaline hydroxide with the contaminated biomass comprises delivering the alkaline hydroxide and the contaminated biomass to a second chemical reactor.

5. The method of claim 1, wherein reacting a first composition comprising an alkaline metal and a second composition to produce an alkaline hydroxide comprises reacting an alkaline metal and water to produce an alkaline hydroxide.

6. The method of claim 5, further comprising:
supplying the alkaline hydroxide to a third chemical reactor; and
reacting a source of a hydrocarbon with the alkaline hydroxide to produce a chemical hydride and a byproduct.

7. The method of claim 6 further comprising:
reacting a source of water with the chemical hydride in a manner to produce a high pressure hydrogen gas and the alkaline hydroxide; and
reusing the alkaline hydroxide in a subsequent chemical reaction to produce the chemical hydride.

8. The method of claim 7, further comprising:
combusting at least a portion of the hydrogen gas produced by the reaction of the alkaline hydroxide with the contaminated biomass and the hydrogen gas produced by the reaction of the alkaline hydroxide with the water to produce heat energy; and
supplying at least a portion of the heat energy to the second chemical reactor and the third chemical reactor.

9. The method of claim 7, wherein reacting the source of water with the chemical hydride in a manner to produce a high pressure hydrogen gas and the alkaline hydroxide comprises:
supplying the water to a container defining a cavity;
increasing the pressure of the water within the container to a high pressure; and
supplying the chemical hydride to the cavity of the container to chemically react with the water that is under high pressure to produce the high pressure hydrogen gas and the alkaline hydroxide.

10. The method of claim 9, further comprising:
utilizing the high pressure hydrogen gas, at least in part, to produce a work product.

11. The method of claim 9, further comprising:
coupling an expansion engine in fluid flowing relation relative to the high pressure hydrogen gas, wherein the expansion engine produces a hydrogen gas output having a reduced temperature and a reduced pressure, and generates a power output;
coupling the expansion engine in fluid flowing relation relative to a refrigeration assembly, wherein the hydrogen gas output having the reduced temperature and the reduced pressure is provided to the refrigeration assembly; and
energizing the refrigeration assembly, at least in part, by supplying the power output generated by the expansion engine to the refrigeration assembly to further reduce the temperature of the hydrogen gas output to liquefy the hydrogen gas.

12. A method for rendering a contaminated biomass inert, comprising:
reacting a contaminated biomass with an alkaline hydroxide to render the contaminated biomass inert and to produce an alkaline metal and a first gas; and
combusting the first gas to generate heat energy that facilitates, at least in part, the chemical reaction of the alkaline hydroxide with the contaminated biomass.

13. The method of claim 12, further comprising:
catalytically reformulating the first gas into a hydrocarbon.

14. The method of claim 12, wherein reacting a contaminated biomass with an alkaline hydroxide to render the contaminated biomass inert and to produce an alkaline metal and a first gas comprises reacting a contaminated biomass with an alkaline hydroxide to render the contaminated biomass inert and to produce an alkaline metal, and at least one member selected from the group consisting of carbon monoxide and hydrogen.

15. The method of claim 12, further comprising:
supplying a source of water to a first chemical reactor; and
supplying the alkaline metal to the first chemical reactor to produce the alkaline hydroxide.

16. The method of claim 15, wherein supplying the source of water to the first chemical reactor comprises a source of uncontaminated water to the first chemical reactor.

17. The method of claim 15, wherein supplying the source of water to the first chemical reactor comprises supplying a source of water containing contaminants that are to be rendered inert to the first chemical reactor.

18. The method of claim 17, wherein the contaminants comprise a hydrocarbon compound containing at least one member selected from the group consisting of fluorine, chlorine, bromine, iodine, a metal, and a metal oxide.

19. The method of claim 15, wherein supplying the alkaline metal to the first chemical reactor to produce the alkaline hydroxide further comprises generating a second gas, and
combusting the first gas and the second gas, at least in part, to generate heat energy that facilitates, at least in part, the chemical reaction of the contaminated biomass that is to be rendered inert, with the alkaline hydroxide.

20. The method of claim 19, wherein generating the second gas comprises generating a hydrogen gas.

21. The method of claim 19, wherein generating the second gas comprises generating carbon monoxide.

22. The method of claim 12, wherein reacting the contaminated biomass with the alkaline hydroxide comprises reacting the alkaline hydroxide and the contaminated biomass at a temperature of greater than about 275° C. and a pressure of greater than about 5 psia.

23. The method of claim 12, wherein reacting the contaminated biomass with the alkaline hydroxide comprises:
supplying the contaminated biomass and the source of the alkaline hydroxide to a second chemical reactor; and
maintaining the second reactor at a temperature and at a pressure that renders the contaminated biomass inert and that produces the first gas and the alkaline metal.

24. The method of claim 23, further comprising supplying at least a portion of the heat energy generated from the combustion of the first gas to the second chemical reactor.

25. The method of claim 23, wherein maintaining the second chemical reactor at a temperature and at a pressure that renders the contaminated biomass inert and that produces the first gas and the alkaline metal comprises maintaining the second chemical reactor at a temperature of greater than about 275° C., and at a pressure of greater than about 5 psia.

26. The method of claim 19, further comprising:
separating the second gas from the alkaline hydroxide prior to the chemical reaction of the alkaline hydroxide with the contaminated biomass that is to be rendered inert.

27. The method of claim 12, further comprising:
supplying, at least in part, a portion of the alkaline hydroxide to a third chemical reactor;
supplying a composition comprising hydrogen to the third chemical reactor;
reacting the alkaline hydroxide and the composition to produce a chemical hydride;
supplying a source of water to a container under pressure;
reacting the chemical hydride with the source of water under pressure within the container to produce high pressure hydrogen gas and byproducts comprising the alkaline hydroxide; and
supplying, at least in part, the alkaline hydroxide produced by the reaction of the chemical hydride with the source of water back to the third chemical reactor.

28. The method of claim 27, wherein supplying a composition comprising hydrogen to the third chemical reactor comprises supplying methane to the third reactor, and wherein reacting the alkaline hydroxide and the composition to produce a chemical hydride comprises reacting the alkaline hydroxide and the methane to produce a chemical hydride and byproducts comprising carbon monoxide, and wherein the method further comprises:
supplying the byproducts comprising carbon monoxide to a shift converter where the byproducts comprising carbon monoxide are chemically converted into carbon dioxide.

29. The method of claim 28, wherein reacting the alkaline hydroxide and the composition to produce a chemical hydride comprises reacting sodium hydroxide and the composition to produce sodium hydride.

30. The method of claim 28, further comprising:
storing a portion of the high pressure hydrogen gas for use in remote location; and
combusting a portion of the high pressure hydrogen gas to produce heat energy that is delivered to the first chemical reactor, the second chemical reactor, and the third chemical reactor.

31. The method of claim 15, further comprising recovering the alkaline metal and reusing the alkaline metal in the first chemical reactor to produce the alkaline hydroxide.

32. A method for rendering a contaminated biomass inert, comprising:
supplying a source of an alkaline metal to a first chemical reactor;
supplying a source of water to the first chemical reactor and reacting the alkaline metal and the water within the first chemical reactor to produce an alkaline hydroxide;
supplying a portion of the alkaline hydroxide to a second chemical reactor and a third chemical reactor;
reacting the alkaline hydroxide with a source of the contaminated biomass within the second chemical reactor to produce an inert biomass, the alkaline metal, and a gaseous output,
wherein the alkaline metal is returned to the first chemical reactor and reacted again with the source of water to generate additional alkaline hydroxide;
combusting the gaseous output to generate heat energy that is delivered, at least in part, to the second chemical reactor and the third chemical reactor;
reacting the alkaline hydroxide and a hydrocarbon within the third chemical reactor under conditions that are effective to produce a chemical hydride;
supplying the source of water under pressure to a container;
supplying the chemical hydride to the container and reacting the chemical hydride with the source of water under pressure to produce a high pressure hydrogen gas and the alkaline hydroxide;
reusing the alkaline hydroxide, at least in part, in the second chemical reactor to react with the contaminated biomass to render the contaminated biomass inert;
reusing the alkaline hydroxide, at least in part, in the third chemical reactor to react with the hydrocarbon to generate an additional chemical hydride that is again reacted with the water in the container to produce an additional high pressure hydrogen gas; and
storing the high pressure hydrogen gas for use.

* * * * *

UNITED STATES PATENT AND TRADEMARK OFFICE
CERTIFICATE OF CORRECTION

PATENT NO. : 7,665,328 B2
APPLICATION NO. : 11/425088
DATED : February 23, 2010
INVENTOR(S) : Bingham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Seventh Day of December, 2010

David J. Kappos
*Director of the United States Patent and Trademark Office*